United States Patent
Park et al.

(10) Patent No.: US 9,426,366 B2
(45) Date of Patent: Aug. 23, 2016

(54) DIGITAL PHOTOGRAPHING APPARATUS AND METHOD OF CONTROLLING THE SAME

(71) Applicant: Samsung Electronics Co., Ltd, Suwon-si, Gyeonggi-do (KR)

(72) Inventors: Myung-won Park, Hwaseong-si (KR); Dong-eui Shin, Anyang-si (KR); Seung-han Lee, Suwon-si (KR); Ki-oh Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 126 days.

(21) Appl. No.: 14/087,348

(22) Filed: Nov. 22, 2013

(65) Prior Publication Data

US 2014/0307161 A1    Oct. 16, 2014

(30) Foreign Application Priority Data

Apr. 16, 2013 (KR) .................. 10-2013-0041838

(51) Int. Cl.
*H04N 5/232* (2006.01)
*G03B 17/14* (2006.01)
*G03B 17/18* (2006.01)

(52) U.S. Cl.
CPC .......... *H04N 5/23241* (2013.01); *G03B 17/14* (2013.01); *G03B 17/18* (2013.01); *H04N 5/23209* (2013.01); *G03B 2206/00* (2013.01)

(58) Field of Classification Search
CPC .. H04N 5/23241; G03B 17/18; G03B 17/14; G03B 2206/00; G02B 7/04; G02B 7/10; G02B 7/023; G02B 17/18; G02B 17/14; G02B 3/02; G02B 2206/00; G06F 1/00; G06F 1/18; G06F 1/183; G06F 13/409; H02J 1/102; H02J 9/00; H02J 9/061; H02J 2007/0095; H02J 7/00; H05K 7/1457; H05K 7/2089; H05K 7/1422
USPC ........................................................ 348/372
See application file for complete search history.

(56) References Cited

U.S. PATENT DOCUMENTS 5,170,201 A * 12/1992 Akiyama ............... G02B 7/102
396/77
5,402,174 A * 3/1995 Takahashi .......... H04N 5/23212
348/345

(Continued)

FOREIGN PATENT DOCUMENTS

JP    2008-086084    4/2008
KR    10-2005-0080556    8/2005

(Continued)

OTHER PUBLICATIONS

Extended European Search Report issued in Application No. 13195926.4 on Feb. 26, 2014.

*Primary Examiner* — Pritham Prabhakher
(74) *Attorney, Agent, or Firm* — Staas & Halsey LLP

(57) ABSTRACT

A digital photographing apparatus having low power consumption includes a lens unit, an encoder sensor configured to detect a rotational state of the lens unit, a power supply controller configured to control power supply such that an operation of turning on the encoder sensor to generate a detection signal and an operation of turning off the encoder sensor are repeatedly performed, and a determiner configured to determine the rotational state of the lens unit from the detection signal.

16 Claims, 10 Drawing Sheets

(56) References Cited

U.S. PATENT DOCUMENTS

| | | | |
|---|---|---|---|
| 5,821,531 A | 10/1998 | Nomura et al. | |
| 8,095,000 B2* | 1/2012 | Shibuno | G02B 7/102 396/125 |
| 8,275,251 B2* | 9/2012 | Isaka | G02B 7/08 396/136 |
| 8,311,405 B2* | 11/2012 | Hirano | G02B 7/102 348/240.3 |
| 9,013,607 B2* | 4/2015 | Taguchi | H04N 5/232 348/240.2 |
| 9,143,660 B2* | 9/2015 | Kawada | G03B 17/14 |
| 2004/0056974 A1* | 3/2004 | Kitajima | H04N 5/23212 348/335 |
| 2005/0078382 A1* | 4/2005 | Nakamura | G02B 7/102 359/704 |
| 2005/0174459 A1* | 8/2005 | Naka | H04N 5/232 348/333.01 |
| 2008/0199170 A1* | 8/2008 | Shibuno | G03B 13/36 396/125 |
| 2010/0091175 A1 | 4/2010 | Shintani et al. | |
| 2011/0091194 A1* | 4/2011 | Isaka | G02B 7/08 396/133 |
| 2011/0115968 A1* | 5/2011 | Yamanaka | G02B 7/102 348/357 |
| 2012/0307131 A1* | 12/2012 | Isaka | G02B 7/08 348/346 |
| 2013/0107105 A1* | 5/2013 | Ishikawa | H04N 5/23212 348/345 |
| 2013/0148007 A1* | 6/2013 | Toyama | G02B 7/08 348/345 |

FOREIGN PATENT DOCUMENTS

| | | |
|---|---|---|
| KR | 10-0701182 | 3/2007 |
| WO | 02/087217 | 10/2002 |

* cited by examiner

DIGITAL PHOTOGRAPHING APPARATUS AND METHOD OF CONTROLLING THE SAME

CROSS-REFERENCE TO RELATED APPLICATIONS

This application claims the benefit of priority under 35 U.S.C. §119 to Korean Patent Application No. 10-2013-0041838, filed on Apr. 16, 2013, in the Korean Intellectual Property Office, the content of which is incorporated herein in its entirety by reference.

BACKGROUND OF THE INVENTION

1. Field of the Invention

Embodiments of the inventive concept relate to a digital photographing apparatus and a method of controlling the same, and more particularly, to a digital photographing apparatus configured to have low power consumption, and a method of controlling the same.

2. Description of the Related Art

Recently, an encoder sensor has been widely used to conveniently detect a direction and a speed of a rotating object. Specifically, the encoder sensor may be used to measure an amount of movement and a direction of a driving source in a digital photographing apparatus or to detect a rotation of a focus ring of a manual focus adjusting lens.

Such an encoder sensor generally detects the direction and the speed of the rotating object based on signals generated by a plurality of sensors. Since a sensor unit always has to be turned on to detect the direction and the speed of the rotating object, unnecessary power consumption may occur. For example, in order to detect the direction of the rotating object, at least two sensors may need to be continuously turned on, and thus the unnecessary power consumption may be increased.

SUMMARY OF THE INVENTION

The present inventive concept provides a digital photographing apparatus configured to have low power consumption by controlling an encoder sensor to be repeatedly turned on and off, and a method of controlling the same.

The present inventive concept also provides a computer-readable recording medium having recorded thereon a program for executing the method.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a digital photographing apparatus including a lens unit, an encoder sensor configured to detect a rotational state of the lens unit, a power supply controller configured to control a supply of power to the encoder sensor so that an operation of turning on the encoder sensor to generate a detection signal and an operation of turning off the encoder sensor are repeatedly performed, and a determiner configured to determine the rotational state of the lens unit from the detection signal.

In an exemplary embodiment, the rotational state may include at least one of information about whether the lens unit has been rotated, a direction of rotation, an amount of rotation, and a speed of rotation of the lens unit.

In an exemplary embodiment, the power supply controller may be configured to reduce power consumption of the encoder sensor by adjusting a time for operating the encoder sensor in an off-state.

In an exemplary embodiment, the power supply controller may be configured to maintain the encoder sensor in an on-state if the determiner has determined that the lens unit has rotated.

In an exemplary embodiment, the power supply controller may be configured to repeatedly perform the operations of turning on and turning off the encoder sensor if the determiner has determined that the lens unit has not rotated.

In an exemplary embodiment, the encoder sensor may include a first sensor and a second sensor having output signals with different phases, and the power supply controller may be configured to control the first sensor to repeatedly perform the operations of turning on and turning off the first sensor and to control the second sensor to maintain an off-state if the determiner has determined that the lens unit has not rotated.

In an exemplary embodiment, the power supply controller may be configured to control the second sensor to repeatedly perform the operations of turning on and turning off the encoder sensor if the determiner has determined that the lens unit has rotated.

In an exemplary embodiment, the power supply controller may be configured to control the first and the second sensors to maintain an on-state if the determiner has determined that the lens unit has rotated.

In an exemplary embodiment, the determiner may be configured to determine a current location of rotation by accumulatively storing the rotational state of the lens unit.

In an exemplary embodiment, the encoder sensor may be configured to detect a rotational state of a focus ring or a zoom ring.

In an exemplary embodiment, the encoder sensor may be a photo-sensor.

In an exemplary embodiment, the encoder sensor may be a brush sensor.

In an exemplary embodiment, the determiner may include an error detector configured to detect an abnormal state transition in the detection signal.

In an exemplary embodiment, the power supply controller may be configured to reduce a time that the encoder sensor is operated in an off-state if the error detector has detected the abnormal state transition.

In an exemplary embodiment, the power supply controller may be configured to control the encoder sensor to maintain an on-state if the error detector has detected the abnormal state transition.

The foregoing and/or other features and utilities of the present inventive concept also provide a method of controlling a digital photographing apparatus having an encoder sensor, the method including turning on the encoder sensor to generate a detection signal, turning off the encoder sensor, and determining a rotational state of a lens unit from the detection signal.

In an exemplary embodiment, the determining the rotational state may include repeatedly the turning on the encoder sensor and the turning off the encoder sensor.

In an exemplary embodiment, the turning on the encoder sensor may include generating the detection signal after a stabilization time delay after the encoder sensor has been turned on.

In an exemplary embodiment, the method may further include adjusting a cycle of receiving the detection signal by adjusting a time the encoder sensor is turned off.

The foregoing and/or other features and utilities of the present inventive concept also provide a computer-readable recording medium having recorded thereon a program for executing the method.

The foregoing and/or other features and utilities of the present inventive concept also provide a system of reducing power consumption including a first member, wherein a position of a portion of the first member is configured to be changed by a manual adjustment, a sensor configured to sense the position of the portion of the first member, and a controller configured to change a position of a second member in response to the position of the portion of the first member and to cause a power to be provided to the sensor in an intermittent manner.

In an exemplary embodiment, the first member may be a ring, the portion may be a protruding portion, and the second member may be a lens.

In an exemplary embodiment, the intermittent manner may be a cycle.

In an exemplary embodiment, a period of the cycle may be substantially less than a time for the manual adjustment.

In an exemplary embodiment, a portion of the cycle in which the power is provided to the sensor may be limited by a stabilization time of electronic components of the system.

In an exemplary embodiment, the sensor may comprise a first sensor and a second sensor, the intermittent manner for the first sensor may be a cycle, and the intermittent manner for the second sensor may prevent the power from being provided to the second sensor until a motion of the portion of the first member has been sensed by the first sensor.

In an exemplary embodiment, after the motion of the portion of the first member has been sensed by the first sensor, the intermittent manner for the second sensor may be the cycle.

The foregoing and/or other features and utilities of the present inventive concept also provide a non-transitory computer-readable recording medium containing instructions which, when executed by an electronic processing element, cause the electronic processing element to perform a method including determining, under a control of the electronic processing element, a position for a first member in response to a manual adjustment of a position of a portion of a second member, and determining, under the control of the electronic processing element, an intermittent manner to provide power to a sensor configured to sense the position of the portion of the second member.

BRIEF DESCRIPTION OF THE DRAWINGS

These and/or other features and utilities of the present general inventive concept will become apparent from the following description of the embodiments, taken in conjunction with the accompanying drawings of which.

DETAILED DESCRIPTION OF THE PREFERRED EMBODIMENTS

Figure 1:
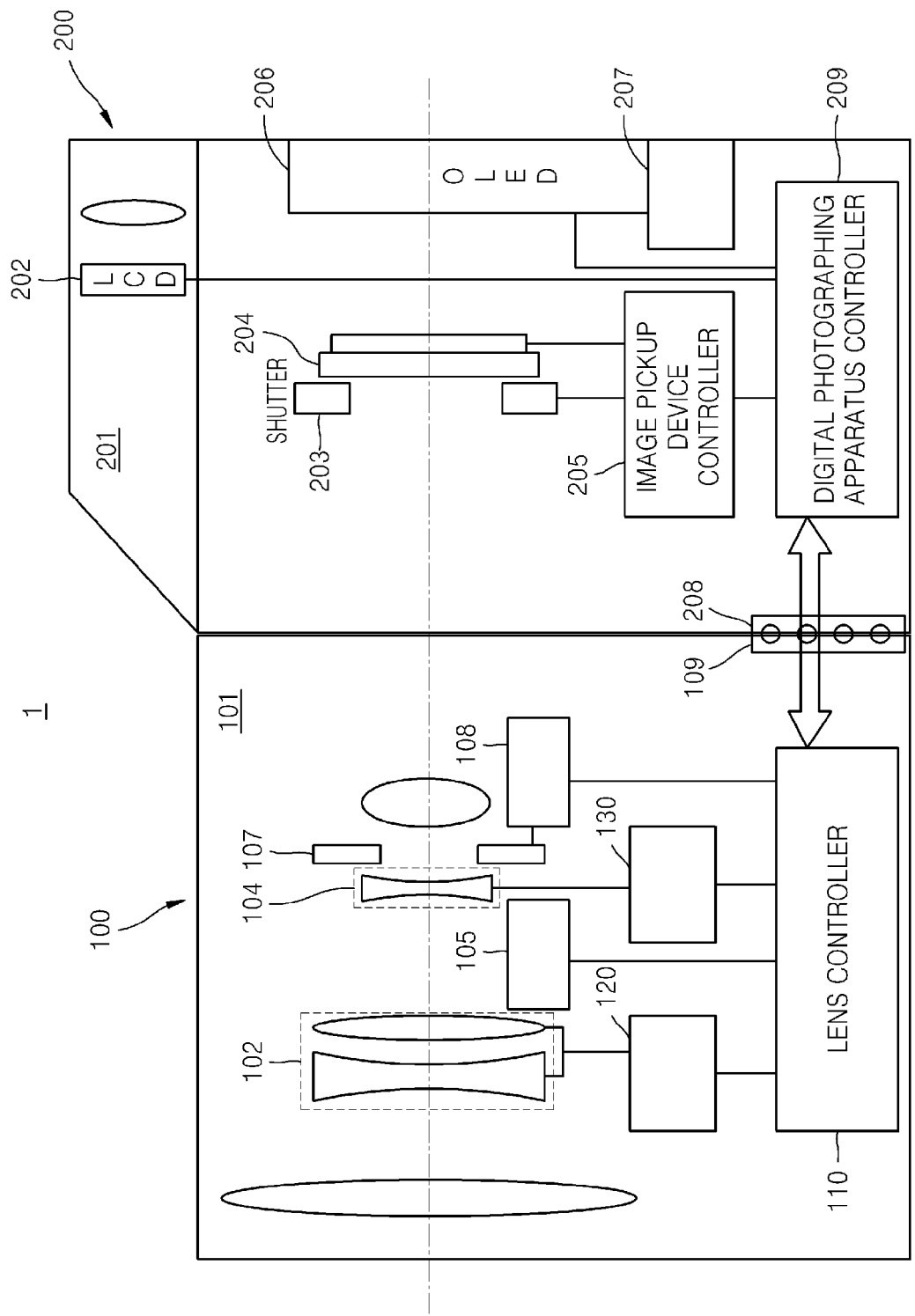
FIG. 1 is a diagram illustrating an example of a digital photographing apparatus according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The general inventive concept may, however, be embodied in many different forms and should not be construed as being limited to the embodiments set forth herein; rather, these embodiments are provided so that this disclosure will be thorough and complete, and will fully convey the concept of the general inventive concept to those skilled in the art. As used herein, the term "and/or" includes any and all combinations of one or more of the associated listed items.

FIG. 1 is a diagram that illustrates an example of a digital photographing apparatus 1 according to an embodiment of the present inventive concept.

Referring to FIG. 1, the digital photographing apparatus 1 may include a lens unit 100 and a body unit 200. FIG. 1 only illustrates components of the lens unit 100 and the body unit 200 that are related to the current embodiment. Thus, the lens unit 100 and the body unit 200 may further include other general-purpose components, which assist in providing the intended purposes of the inventive concept as described herein.

The lens unit 100 be configured to perform a focus detecting function, and the body unit 200 may be configured to perform a function of driving a focus lens 104 of the lens unit 100. For example, when manual focus adjustment is used, a zoom lens 102 and the focus lens 104 of the lens unit 100 may be driven in accordance with a manipulation by a user.

The lens unit 100 may include an image forming optical system 101, a lens driving actuator 105, encoder sensors 120 and 130, an iris driving actuator 108, a lens controller 110, and a lens mount 109. Also, the image forming optical system 101 may include the zoom lens 102 configured to perform a zoom adjustment, the focus lens 104 configured to change a focal position, and an iris 107. The zoom lens 102 and the focus lens 104 may each be a lens group, which may include a plurality of lenses.

In an embodiment, the encoder sensors 120 and 130 may be general sensors used to measure an angle of rotation, a speed of rotation, and an amount of rotation of a rotating object, such as, for example, an electric motor. The encoder sensors 120 and 130 may calculate locations of the zoom lens 102 and the focus lens 104 by detecting rotation of the lens unit 100, according to an embodiment of the present inventive concept. However, the present inventive concept is not limited thereto, and the encoder sensors 120 and 130, for example, may only determine whether the lens unit 100 rotates and a direction of rotation of the lens unit 100, and may include a separate sensor (not illustrated) to calculate the locations of the zoom lens 102 and the focus lens 104. A method and/or a timing of determining a rotational state of the focus lens 104 by using the encoder sensors 120 and 130 may be set by the lens controller 110 and/or a digital photographing apparatus controller 209.

For example, in an automatic focus adjustment, the lens driving actuator 105 and the iris driving actuator 108 may be controlled by the lens controller 110 to respectively drive the focus lens 104 and the iris 107. For example, the lens driving actuator 105 may drive the focus lens 104 in an optical axis direction. Also, at this time, for example, the encoder sensor 130 may detect a direction of movement and an amount of movement of the focus lens 104 to determine a location of the focus lens 104.

In an embodiment, the focus lens 104 may be manually manipulated by the user, and the encoder sensor 130 may detect the location of the focus lens 104 according to the manual manipulation by the user. For example, the user may move the focus lens 104 by manually manipulating a rotation ring (not illustrated), and the encoder sensor 130 may calculate the location of the focus lens 104 by detecting a rotational state of the rotation ring. In embodiments, configurations of moving the location of the focus lens 104 by using the rotation ring may be implemented to assist in providing the intended purposes of the inventive concept as described herein.

The encoder sensor 130 may be configured to detect a rotational state of not only a fixed type lens, but also an exchange type lens, and different types of exchange type lenses. Examples of exchange type lenses may include a type wherein a focus lens may move in a close-up photographing direction (hereinafter referred to as a "close-up direction") in accordance with a rotation in a right direction R, and may move in a subject photographing direction (hereinafter referred to as an "infinite direction") at an infinite focal point location in accordance with a rotation in a left direction L, and a type wherein a focus lens may move in a close-up direction or an infinite direction according to a rotation in the left direction L or in the right direction R. In an embodiment, the encoder sensor 130 may detect a rotational state regardless of a type in accordance with a control of the lens controller 110.

However, when the encoder sensor 120 is used, for example, to determine the direction of movement of the focus lens 104 or the zoom lens 102, the encoder sensor 120 may always have to be turned on since it may not be known when the focus lens 104 or the zoom lens 102 will rotate. For example, when the digital photographing apparatus 1 uses a manual focus adjustment, a time in which the focus lens 104 or the zoom lens 102 of the lens unit 100 may be operated may be very short, but the encoder sensors 120 and 130 may always have to be turned on to be ready to operate the focus lens 104 or the zoom lens 102, and thus unnecessary power consumption may occur. In addition, since at least two photo-sensors may be required, as described below with reference to FIG. 4, in order for the encoder sensors 120 and 130 that may be used in the digital photographing apparatus 1 to determine the direction of rotation of the lens unit 100, power consumption may be high.

In an embodiment, the encoder sensor 120 may be controlled to repeatedly perform on and off operations in order to store power during an off-state and to determine a rotation of a rotation ring (not illustrated) during an on-state, thereby reducing power consumption. A method of controlling the encoder sensors 120 and 130 is described in detail below with reference to FIGS. 2 through 15.

For example, when the lens controller 110 calculates the location of the focus lens 104, the lens controller 110 may transmit information about the calculated location to the body unit 200. In an embodiment, if the location of the focus lens 104 has been changed or the digital photographing apparatus controller 209 has requested the information about the calculated location, the lens controller 110 may transmit the information about the calculated location to the body unit 200. In an embodiment, when manual focus adjustment is used, the lens controller 110 may continuously calculate and transmit information about the rotational state of the lens unit 110 to the body unit 200.

The encoder sensor 130 and the rotational state of the lens unit 100 may be controlled by the lens controller 110 in an embodiment, but the present inventive concept is not limited thereto. Alternatively, the digital photographing apparatus controller 209 may perform functions of the lens controller 110, or the lens controller 110 and the digital photographing apparatus controller 209 may form one controller.

The lens mount 109 may include a lens communication pin (not illustrated) and may be used on a transmission path of data, control signals, etc., by being engaged to a digital photographing apparatus communication pin (not illustrated).

A structure of the body unit 200 is described below.

The body unit 200 may include a viewfinder 201, a shutter 203, an image pickup device 204, an image pickup device controller 205, a display unit 206, a manipulation key 207, the digital photographing apparatus controller 209, and a digital photographing apparatus mount 208.

A liquid crystal display (LCD) unit 202 may be embedded in the viewfinder 201 in order to show, in real time, an image being captured.

The shutter 203 determines an amount of time light may be applied to the image pickup device 204, i.e., an exposure time.

The image pickup device 204 may generate an image signal by capturing light that passed through the image forming optical system 101 of the lens unit 100. The image pickup device 204 may include, for example, a plurality of photoelectric conversion units arranged in a matrix form, and a vertical and/or horizontal transmission path configured to read an image signal through the movement of electric charges in the photoelectric conversion units. The image pickup device 204, for example, may be a charge-coupled device (CCD) sensor or a complementary metal oxide semiconductor (CMOS) sensor.

The image pickup device controller 205 may generate a timing signal, and may control the image pickup device 204 to capture an image by synchronizing with the timing signal. In an embodiment, the image pickup device controller 205, for example, may sequentially read horizontal direction image signals after the electric charges have been accumulated on each scanning line. The horizontal direction image signals may be used by the digital photographing apparatus controller 209 to detect a focus.

The display unit 206 may display various images and information. The display unit 206, for example, may be an organic light-emitting display (OLED). Alternatively, for example, a general LCD may be used. In an embodiment, a touch panel (not illustrated) may be provided on a surface cover (not illustrated) in order to touch an image while viewing the image.

The manipulation key 207 may be used to receive various commands from a user in order to manipulate the digital photographing apparatus 1. The manipulation key 207 may include various buttons such as, for example, a shutter-release button (not illustrated), a main switch (not illustrated), a mode dial (not illustrated), and a menu button (not illustrated).

The digital photographing apparatus controller 209 may calculate a focus detection evaluation value by detecting a focus of the image signal generated by the image pickup device 204. In an embodiment, the digital photographing apparatus controller 209 may store the focus detection evaluation value at a focus detection evaluation time according to the timing signal generated by the image pickup device controller 205, and may calculate a focal position by using the focus detection evaluation value stored as a lens location information received from the lens unit 100. The digital photographing apparatus mount 208 may include the digital photographing apparatus communication pin (not illustrated), and may transmit a result of calculating the focal position to the lens unit 100 through the digital photographing apparatus communication pin (not illustrated).

Operations of the lens unit 100 and the body unit 200 are schematically described below.

For example, when the subject is photographed, an operation of the digital photographing apparatus 1 may be started by manipulating a main switch (not illustrated), which may be included in the manipulation key 207. The digital photographing apparatus 1, for example, may first display a live-view.

Light reflected from the subject and passed through the image forming optical system 101 may be incident on the image pickup device 204. The shutter 203 may be in an opened state. The incident light reflected from the subject may be converted into an electric signal by the image pickup device 204, and thus an image signal may be generated. The image pickup device 204 may operate according to the timing signal generated by the image pickup device controller 205. The image signal of the subject may be converted into displayable data by the digital photographing apparatus controller 209, and may be output to the viewfinder 201 and/or the display unit 206. Such an operation may be referred to as a live-view display, and images displayed in accordance with a live-view display may be continuously displayed as a moving image. During a live-view display, manual focus adjustment may be performed in accordance with a manipulation by a user, and the user may perform the manual focus adjustment by manipulating the focus ring (not illustrated) to move the focus lens 104.

For example, after a live-view display has been performed and the digital photographing apparatus 1 has been placed in an automatic focus adjustment mode, an autofocus (AF) operation may be started when the shutter-release button (not illustrated), included in the manipulation key 207, is, for example, half-pressed. The image pickup device 204 may perform the autofocus operation by using the image signal. In a contrast autofocus mode, the focal position may be calculated from the focus detection evaluation value to affect a contrast value, and the lens unit 100 may be driven based on a result of calculating the focal position. For example, when the focus detection evaluation value has been calculated, the digital photographing apparatus controller 209 may calculate information to control the focus lens 104 based on the focus detection evaluation value, and may transmit the information to the lens controller 110 through the lens communication pin (not illustrated) and the digital photographing apparatus communication pin (not illustrated) of the lens mount 109 and the digital photographing apparatus mount 208.

The lens controller 110 may control the lens driving actuator 105 based on the information so that the focus lens 104 may be driven in the optical axis direction to perform the autofocus operation. In an embodiment, since the location of the focus lens 104 may be monitored by using the encoder sensor 130, the focus lens 104 may reach a desired location via feedback control. In an embodiment, the lens controller 110 may track an accurate location of the focus lens 104 by accumulatively storing locations and amounts of movement of the focus lens 104.

For example, when the zoom lens 102 is used by a user, a location of the zoom lens 102 may be detected by the encoder sensor 120 based on a rotational state of the zoom ring (not illustrated), and the lens controller 110 may perform the autofocus operation again by changing autofocus control parameters of the focus lens 104.

For example, when the subject is focused via the above operations, the shutter-release button (not illustrated) may be fully pressed, and thus the digital photographing apparatus 1 may perform an exposure operation. In an embodiment, the digital photographing apparatus controller 209 may completely close the shutter 203 and may transmit measured light information to the lens controller 110 as iris control information. The lens controller 110 may control the iris driving actuator 108 based on the iris control information, and may adjust the iris 107 to have a suitable iris value. The digital photographing apparatus controller 209 may control the shutter 203 based on the measured light information, and may capture an image of the subject by opening the shutter 203 for a suitable exposure time.

The captured image may be processed and compressed to be stored in a memory card (not illustrated). At the same time, for example, the captured image may be output to the viewfinder 201 and/or the display unit 206. Such a captured image may be referred to as a quick-view or an after-view. A series of photographing operations may be completed as such.

In FIG. 1, the lens unit 100 may be a switch lens detachable from the body unit 200, but the present inventive concept is not limited thereto. For example, the lens unit 100 may be integrally formed with the body unit 200. In an embodiment, the lens mount 109 or the digital photographing apparatus mount 208 may not be used, and the digital photographing apparatus controller 209 may perform operations of the lens controller 110. For example, the digital photographing apparatus controller 209 may directly control the lens driving actuator 105 and the iris driving actuator 108, and may directly receive information about the rotational state of the lens unit 100 or the locations of the zoom lens 102 and/or the focus lens 104 from the encoder sensors 120 and 130.

Figure 2:
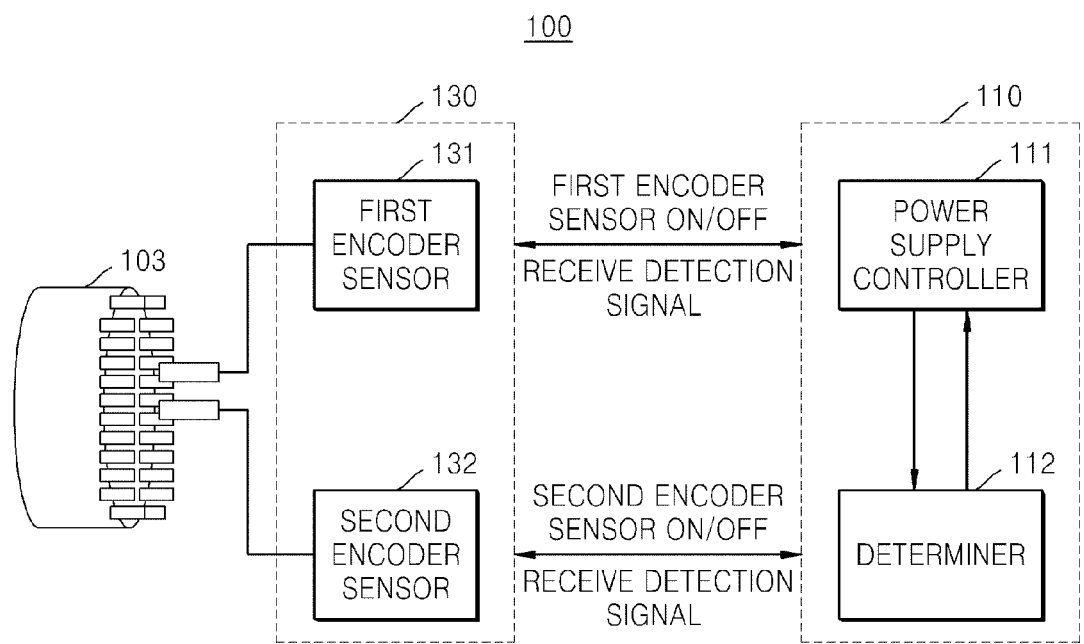
FIG. 2 is a block diagram illustrating an example of a lens unit configured to detect a rotational state of a rotation ring, according to an embodiment of the present inventive concept.

FIG. 2 is a block diagram that illustrates an example of the lens unit 100 configured to detect a rotational state of a rotation ring 103, according to an embodiment of the present inventive concept.

Referring to FIG. 2, the lens unit 100 may be configured to detect a rotational state of the rotation ring 103 and may include the rotation ring 103, the encoder sensor 130, and the lens controller 110. The encoder sensor 130, for example, may include two sensors, i.e., a first encoder sensor 131 and a second encoder sensor 132, and the lens controller 110, for example, may include a power supply controller 111 and a determiner 112. (The encoder sensor 120, for example, may also include two sensors similar to the first encoder sensor 131 and the second encoder sensor 132.)

FIG. 2 only shows components of the lens unit 100 that are related to an embodiment. Thus, the lens unit 100 may further include other general-purpose components, which assist in providing the intended purposes of the inventive concept as described herein.

In an embodiment, the power supply controller 111 and the determiner 112 of the lens controller 110 may correspond to one or more processors. A processor may be an array of a plurality of logic gates, or a combination of a general-purpose microprocessor and a memory configured to store a program executable in the microprocessor. Alternatively, the processor may be realized as hardware in another form.

The encoder sensor 130 may measure the rotational state of the rotation ring 103 by using the first and second encoder sensors 131 and 132. In an embodiment, the rotational state may include information about whether the rotation ring 103 rotates, a direction of rotation, an amount of rotation, and a speed of rotation. The rotation ring 103 may be a driving source for moving a lens for automatic focus adjustment, or may be a focus ring or zoom ring configured to be manipulated by a user for a manual focus adjustment.

Figure 3:
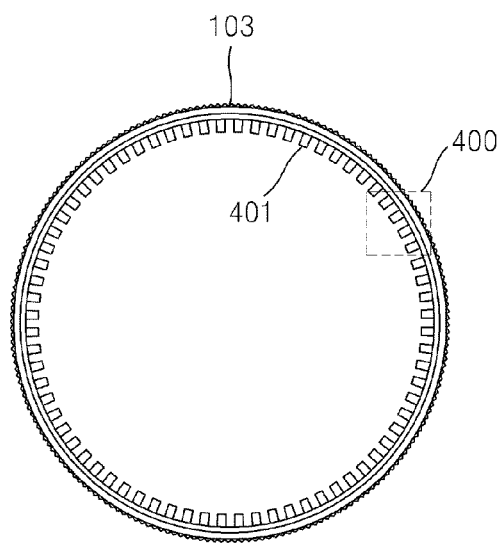
FIGS. 3 and 4 are diagrams illustrating an example of a method of detecting a rotational state of a rotation ring by using an encoder sensor, according to an embodiment of the present inventive concept.
Figure 4:
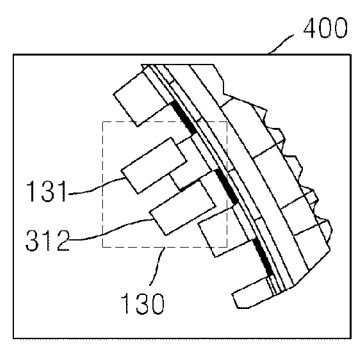

FIGS. 3 and 4 are diagrams that illustrate an example of a method of detecting the rotational state of the rotation ring 103 by using the encoder sensor 130, according to an embodiment of the present inventive concept.

Referring to FIG. 3, the rotation ring 103, in accordance with an embodiment, may include a protruding portion 401 having, for example, a sawtooth shape. For example, the encoder sensor 130, which may include at least two photo-sensors, may detect the protruding portion 401 to detect the rotational state of the rotation ring 103. In an embodiment, a shape of the rotation ring 103 may not be limited to the shape shown in FIG. 3, and may vary as long as the rotation ring 103 may be configured to detect rotation of the lens unit 100 caused by a manipulation by a user or an operation of a motor.

Referring to FIG. 4, in order to detect movement of the protruding portion 401, in accordance with an embodiment, the first and second encoder sensors 131 and 132, for example, may be disposed in parallel as shown in a region 400. The first and second encoder sensors 131 and 132 may detect the rotation of the protruding portion 401, for example, by using a photo-sensor, or the like, to detect a direction of rotation, an amount of rotation, and a speed of rotation of the rotation ring 103. In an embodiment, the first and second encoder sensors 131 and 132 may be disposed at a suitable interval so that a signal having a phase of 90° may be generated.

Referring back to FIG. 2, for example, when the detection signal generated after the encoder sensor 130 is turned on is transmitted to the determiner 112, the determiner 112, upon receiving the detection signal, may calculate the rotational state of the rotation ring 103. A method of determining the direction of rotation of the lens unit 100 based on a detection signal having a phase of 90° is described in detail with reference to FIGS. 5A and 5B.

Figure 5A:
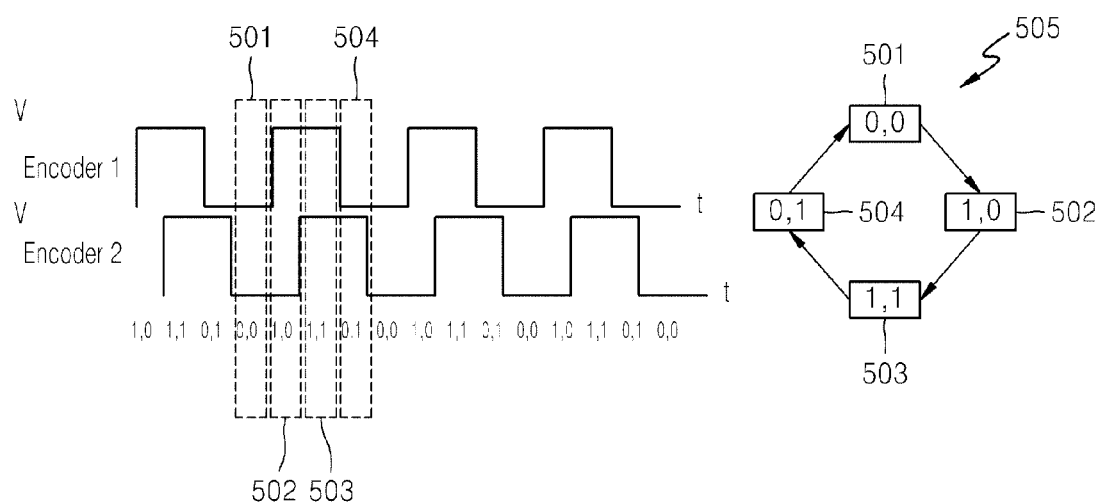
FIGS. 5A and 5B are diagrams illustrating an example of a method of determining a direction of rotation of a rotating object, according to an embodiment of the present inventive concept.
Figure 5B:
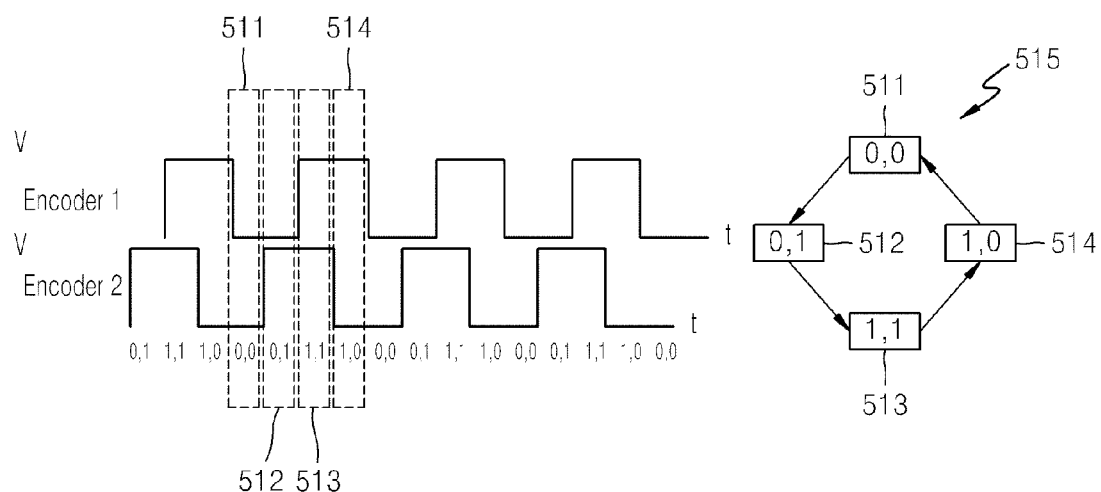

FIGS. 5A and 5B are diagrams that illustrate an example of a method of determining a direction of rotation of a rotating object based on a signal generated by the encoder sensor 130, according to an embodiment of the present inventive concept.

FIG. 5A illustrates a graph of a voltage V output by the encoder sensor 130 as a function of time t when the rotation ring 103 rotates, for example, clockwise and the first and second encoders 131 and 132 are disposed to output a signal having a phase of 90°.

For example, the determiner 112 may determine that the rotation ring 103 is rotating clockwise as illustrated by a state transition graph 505 in which states (0,0) 501, (1,0) 502, (1,1) 503, and (0,1) 504 may be sequentially detected from detection signals of the first and second encoder sensors 131 and 132.

FIG. 5B illustrates a graph of a voltage V output by the encoder sensor 130 as a function of time t when the rotation ring 103 rotates, for example, counterclockwise and the first and second encoders 131 and 132 are disposed to output a signal having a phase of 90°.

For example, the determiner 112 may determine that the rotation ring 103 is rotating counterclockwise as illustrated by a state transition graph 515 in which states (0,0) 511, (0,1) 512, (1,1) 513, and (1,0) 514 may be sequentially detected from detection signals of the first and second encoder sensors 131 and 132.

In an embodiment, the determiner 112 may determine state transition based on the detection signal received from the encoder sensor 130, and thus determine the direction of rotation of the rotation ring 103. In addition, the speed of rotation and the amount of rotation of the rotation ring 103 may be determined based on an interval of the state transition. In an embodiment, when the lens unit 100 is configured to rotate together with the rotation ring 103, the determiner 112 may also determine the rotational state of the lens unit 100 based on the detection signal received from the encoder sensor 130.

Referring back to FIG. 2, the power supply controller 111 may control the encoder sensor 130 to be turned on and off repeatedly in regular cycles.

In the general digital photographing apparatus 1, for example, when the encoder sensor 120 is used to determine the direction of movement of the focus lens 104 or the zoom lens 102, the rotation of the focus lens 104 or the zoom lens 102 may be unknown, and thus the encoder sensor 120 may need to always remain in an on-state. In an embodiment, in the digital photographing apparatus 1, when a manual focus adjustment is used, a time when the focus lens 104 or the zoom lens 102 of the lens unit 100 may be operated may be very short, but the encoder sensor 130 may have to always remain turned on to determine the operation of the focus lens 104 or the zoom lens 102, and thus power may be unnecessarily consumed. In an embodiment, since the encoder sensors 120 and 130 may need at least two photo-sensors, as described above, in order to determine the direction of rotation of the lens unit 100, power consumption may be considerably high.

In an embodiment, the encoder sensor 120 may be controlled to be turned on and off repeatedly so that power may be stored while the encoder sensor 120 may be in an off-state and detection may be performed while the encoder sensor 120 may be in an on-state. In an embodiment, the rotation of the rotation ring 103 may be determined while reducing power consumption. A method of controlling an encoder sensor will now be described in detail with reference to FIG. 8.

Figure 8:
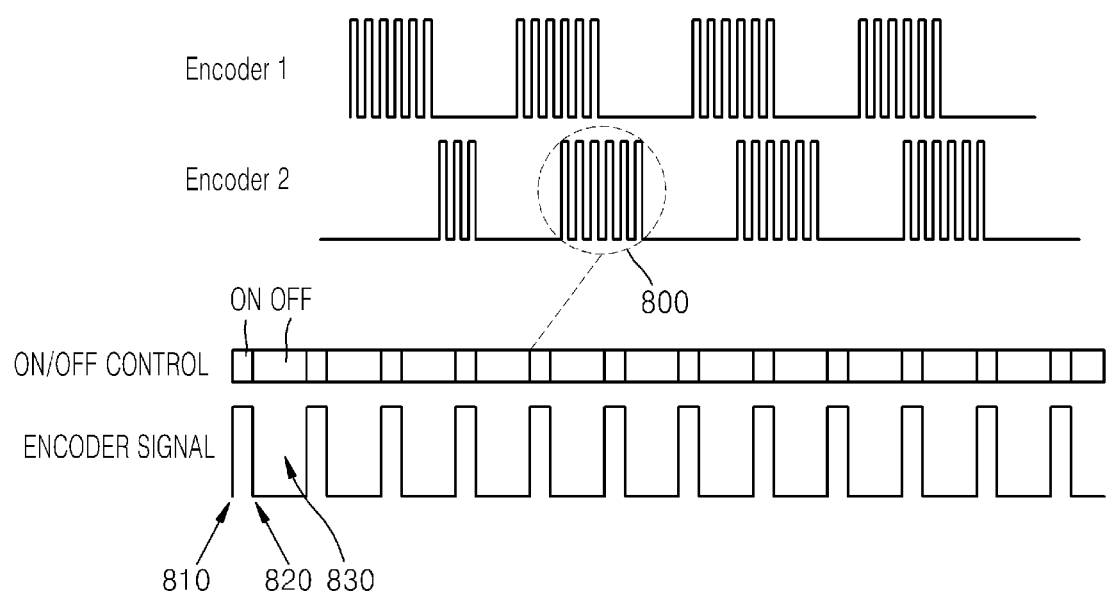
FIG. 8 is a time-voltage graph illustrating an example of a power supply controller configured to control an encoder sensor to be repeatedly turned on and off, according to an embodiment of the present inventive concept.

FIG. 8 is a time-voltage graph that illustrates an example of the power supply controller 111 configured to control the encoder sensor 130 to be repeatedly turned on and off, according to an embodiment of the present inventive concept.

Referring to FIG. 8, for example, as the power supply controller 111 repeatedly turns on and off power, an output signal of the first encoder sensor 131 and an output signal of the second encoder sensor 132 may be illustrated as pulse shapes 800. However, since an overall outer shape of the output signals may be the same as the waveform of the signals illustrated in FIGS. 5A and 5B, the determiner 112 may determine whether the rotation ring 103 rotates and the direction of rotation of the rotation ring 103 in the same manner as described above.

Referring to an enlarged graph of the pulse shape 800 illustrated at the bottom of FIG. 8, the power supply controller 111 may perform an operation 810 of turning on the encoder sensor 130 to generate a detection signal, and then may perform an operation 820 of turning off the encoder sensor 130. In an embodiment, the encoder sensor 130 may consume power only between operations 810 and 820, and may store power during operation 830 of remaining in an off-state in which power may be barely consumed. The encoder sensor 130 may repeat operations 810 through 830 in regular cycles, and may transmit a signal detected a plurality of times to the determiner 112. The determiner 112 may detect state transition by continuously receiving two signals from the first and second encoder sensors 131 and 132 to determine the direction of rotation of the rotation ring 103 in the same manner described above with reference to FIGS. 5A and 5B. For example, since a state of an output waveform of an encoder signal shown in FIG. 8 may be changed in an order of (0,0), (1,0), (1,1), and (0,1), it may be determined that the rotation ring 103 is rotating clockwise.

Figure 9:
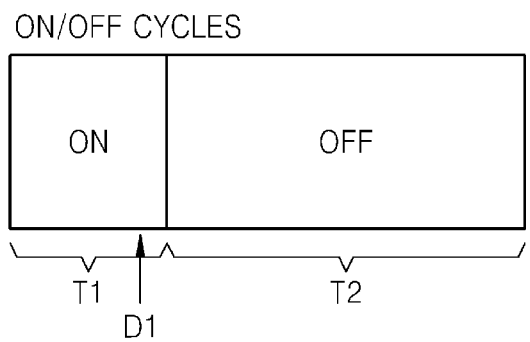
FIG. 9 is a diagram illustrating an amount of power reduction realized from a cycle of turning an encoder sensor on and off, according to an embodiment of the present inventive concept.

FIG. 9 is a diagram that illustrates an amount of power reduction amount realized from a cycle of turning the encoder sensor 130 on and off, according to an embodiment of the present inventive concept.

Referring to FIG. 9, a sum of a time T1 and a time T2 may be a cycle time for the encoder sensor 130 to measure a rotational state of the rotation ring 103. For example, a point in time when the encoder sensor 130 may generate the detection signal may be the point in time D1 before the time T1 has elapsed and switched to the time T2. In terms of reducing power consumption of the encoder sensor 130, the power reduction amount may be great when the time T1 is short. However, since time reduction may be limited by a stabilization time of power controlling components, the time T1 may be the stabilization time.

For example, when the encoder sensor 130 generates the detection signal after the time T1, the power supply controller 111 may control the encoder sensor 130 to operate in an off-state in order to prevent power consumption during the time T2. The determiner 112 may obtain the detection signal of the encoder sensor 130 to calculate the direction of rotation of the rotation ring 103. In an embodiment, the detection signal generated by the encoder sensor 130 to calculate the direction of rotation may be signals having a phase difference of 90° that are generated by the first and second encoder sensors 131 and 132 of the encoder sensor 130.

For example, when the encoder sensor 130 is controlled as such, power consumption may be reduced by $T1/(T1+T2)$, compared to the power consumption described above with reference to FIGS. 5A and 5B because the encoder sensor 130 may be operated in an off-state during the time T2. For example, when the time T1 is 50 microseconds and the time T2 is 950 microseconds, the encoder sensor 130 may perform operations by using 5% of the power, compared to a general encoder sensor. In other words, for example, when the general encoder sensor uses a current of 20 mA, the encoder sensor 130 may calculate the rotational state by only using a current of 1 mA.

Figure 10:
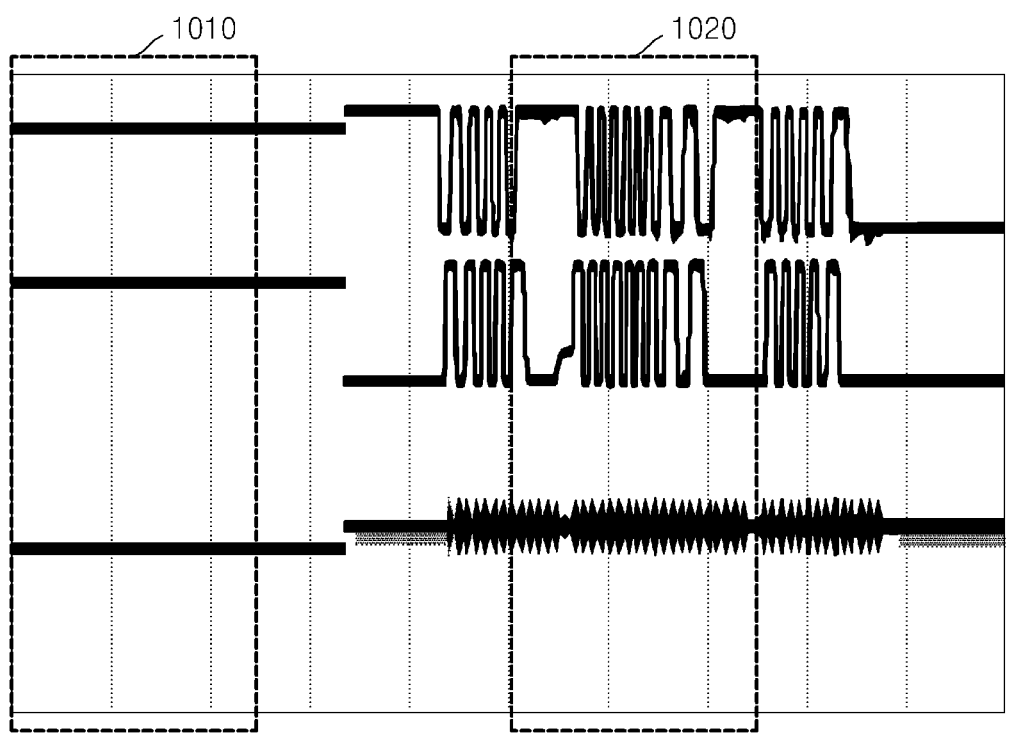
FIG. 10 is a graph illustrating operation of an encoder sensor in an off-state and an on-state.

FIG. 10 is a graph that illustrates operation of the encoder sensor 130 in an off-state and an on-state.

Three waveforms are illustrated in FIG. 10, which sequentially denote, from top to bottom, an output signal of the first encoder 131, an output signal of the second encoder 132, and a current consumed by the encoder sensor 130. Referring to FIG. 10, a current of 66 mA may be consumed, for example, when the encoder sensor 130 is in an on-state 1020, and a current of only 53.68 mA, which may be an amount of current used by a system, is consumed when the encoder sensor 130 is in an off-state 1010. In other words, the current consumed by the encoder sensor 130, for example, may be about 13 mA.

Figure 11A:
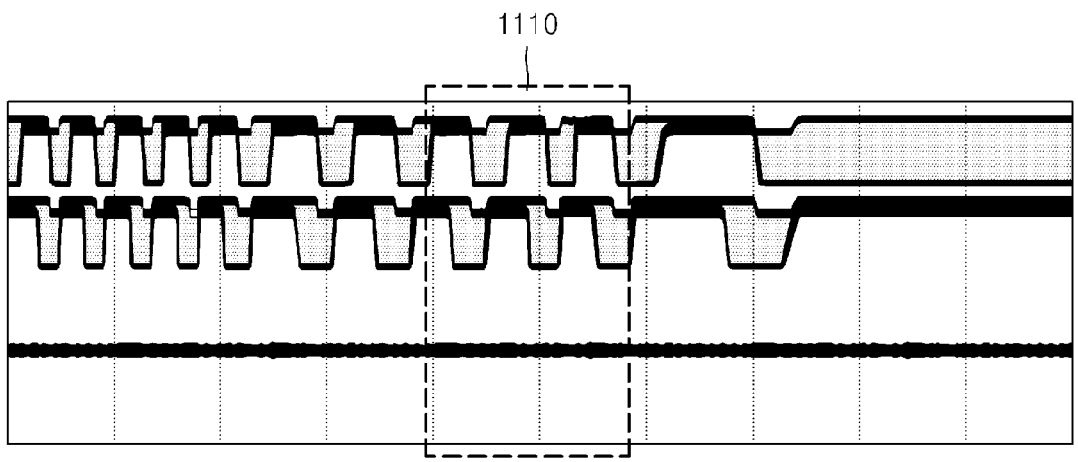
FIG. 11A is a graph illustrating an actual operation waveform when a power supply controller controls an encoder sensor to be repeatedly turned on and off at a time ratio of 1:9, according to an embodiment of the present inventive concept.

FIG. 11A is a graph that illustrates an actual operation waveform when the power supply controller 111 controls the encoder sensor 120 to be repeatedly turned on and off at a time ratio of 1:9, according to an embodiment of the present inventive concept.

Figure 11B:
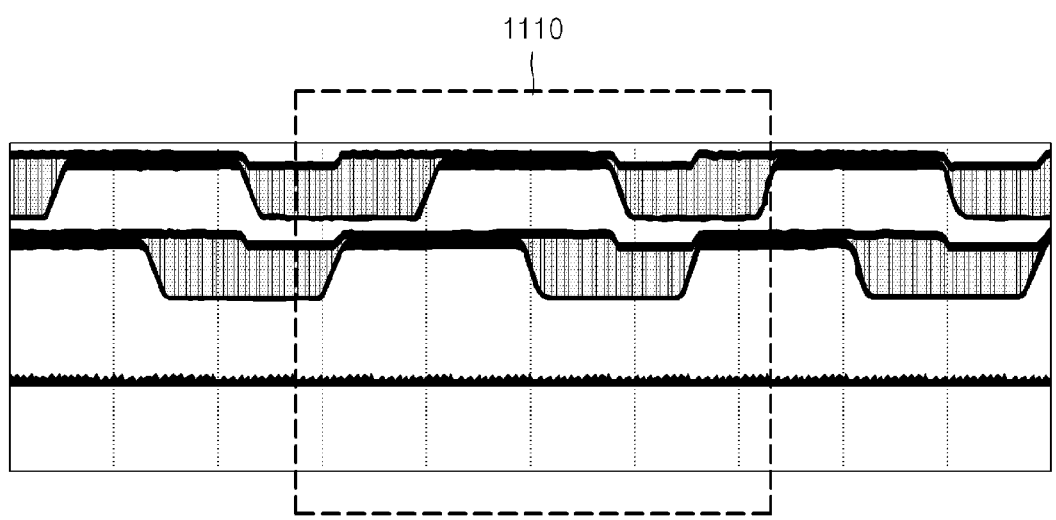
FIG. 11B is an enlarged view of an area of FIG. 11A.

FIG. 11B is an enlarged view of an area 1110 of FIG. 11A.

Referring to FIGS. 11A and 11B, three waveforms sequentially denote, from top to bottom, the output signal of the first encoder sensor 131 of encoder sensor 120, the output signal of the second encoder sensor 132 of encoder sensor 120, and the power consumption of the encoder sensor 120. FIGS. 11A and 11B are graphs that illustrate the actual operation waveform when the power supply controller 111 controls the encoder sensor 120 to be repeatedly turned on and off at the time ratio of 1:9. In an embodiment, a current consumed may be 55.48 mA. As described above with reference to FIG. 10, since the current used in the system may be 53.68 mA, a current consumed by the encoder sensor 120 may be about 1.8 mA.

In an embodiment, since the current consumed by the encoder sensor 130 may be 13 mA when the encoder sensor 130 is always turned on, current consumption may be reduced by 90% when the encoder sensor 130 is controlled to be repeatedly turned on and off at the time ratio of 1:9. Also, when a percentage of the time during which the encoder sensor 130 operates in an off-state is increased, the current reduction amount may be increased.

Figure 6A:
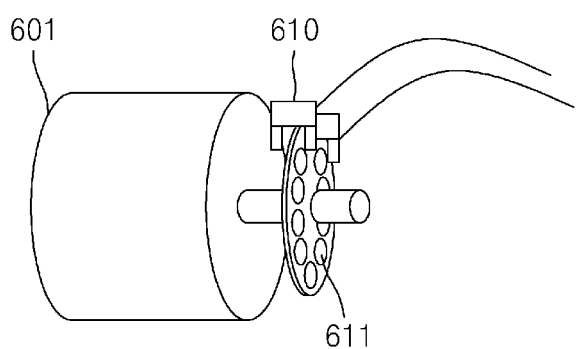
FIGS. 6A and 6B are diagrams illustrating examples of a method of using an encoder sensor to detect a rotation of a motor by using a photo-sensor, according to embodiments of the present inventive concept.
Figure 6B:
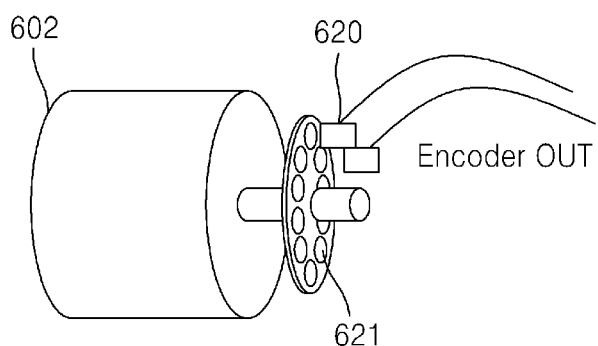

FIGS. 6A and 6B are diagrams that illustrate examples of a method of using an encoder sensor 610 or 620 to detect a rotation of a motor 601 or 602 by using a photo-sensor, according to embodiments of the present inventive concept.

In an embodiment, referring to FIG. 6A, the motor 601 may include a rotation plate 611 configured to rotate with the motor 601, and the encoder sensor 610 may detect rotation of the rotation plate 611. For example, the encoder sensor 610 may comprise a photo-sensor that may be disposed as illustrated in FIG. 6A to detect the rotation of the rotation plate 611. According to a method of detecting the rotation of the rotation plate 611, a direction of rotation may be detected by determining a state transition based on a detection signal output from the encoder sensor 610, and in addition, a speed of rotation and an amount of rotation may be determined based on an interval of the state transition.

In an embodiment, referring to FIG. 6B, the motor 602 may include a rotation plate 621 configured to rotate with the motor 602, and the encoder sensor 620 may detect rotation of the rotation plate 621. For example, the encoder sensor 620 may comprise a photo-sensor that may be disposed as illustrated in FIG. 6B to detect the rotation of the rotation plate 621.

Figure 7:
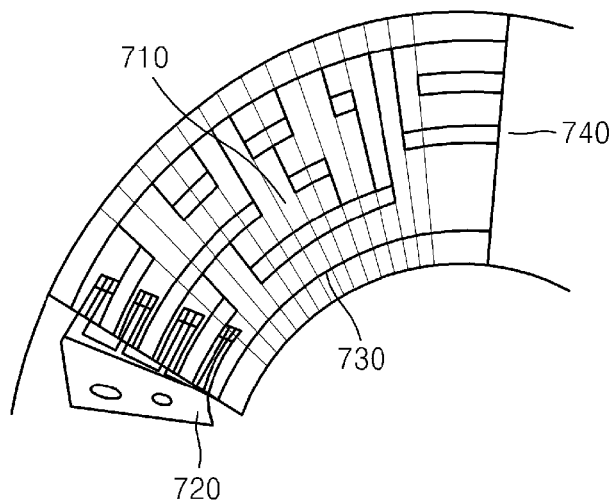
FIG. 7 is a diagram illustrating a method of recognizing a pattern of a target by using a brush sensor, according to an embodiment of the present inventive concept.

FIG. 7 is a diagram that illustrates a method of recognizing a pattern 730 of a target by using a brush sensor 720, according to an embodiment of the present inventive concept.

For example, referring to FIG. 7, the brush sensor 720 may generate an encoder sensor detection signal 740 by detecting the pattern 730 while rotating on the target having a circuit or a curved surface in one direction 710. Since a method of detecting the pattern 730 by using the brush sensor 720 is a well-known technology, details thereof are omitted herein.

Referring to FIGS. 6 and 7, for example, one or more of the encoder sensors 610 and 620 detecting rotational states of the motors 601 and 602 of FIG. 6 and the brush sensor 720 detecting the pattern 730 of the target of FIG. 7 may also be controlled to be repeatedly turned on and off. In other words, as described above with reference to FIG. 2, power consumption may be reduced by repeatedly turning power on and off.

Figure 12:
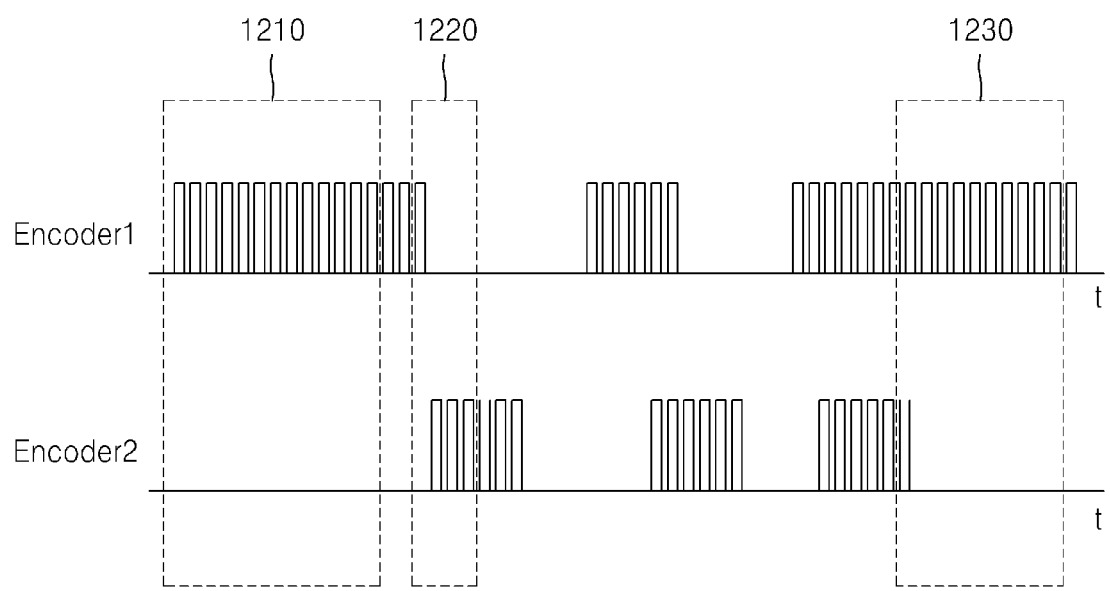
FIG. 12 is a time-voltage graph illustrating another example of a power supply controller configured to control an encoder sensor to be repeatedly turned on and off, according to an embodiment of the present inventive concept.

FIG. 12 is a time-voltage graph that illustrates another example of the power supply controller 111 configured to control the encoder sensor 130 to be repeatedly turned on and off, according to an embodiment of the present inventive concept.

For example, referring to FIG. 12, the power supply controller 111 only may control the first encoder sensor 131, from among the first and second encoder sensors 131 and 132, to be repeatedly turned on and off in order to detect the rotation of the rotation ring 103. For example, if the first encoder sensor 131 is unable to detect the rotation during a time 1210, the second encoder sensor 132 may remain in an off-state. In such an example, 50% of the power consumption may be further reduced in comparison with an example in which both of the first and second encoder sensors 131 and 132 are repeatedly turned on and off.

For example, when the first encoder sensor 131 detects the rotation during a time 1220, the second encoder sensor 132 may be repeatedly turned on and off to detect the direction of rotation. The determiner 112 may calculate the direction of rotation by determining the state transition based on the output signals of the first and second encoder sensors 131 and 132.

For example, if the rotation of the rotation ring 103 is not detected again during a time 1230, the second encoder sensor 132 may again remain in the off-state to reduce power consumption until the rotational state of the rotation ring 103 is detected. In such an example, power consumption may be further reduced in comparison with an example in which both of the first and second encoder sensors 131 and 132 are repeatedly turned on and off.

In an embodiment, when the encoder sensor 130 is in a standby state so that the rotational state may not be detected, the encoder sensor 130 may be repeatedly turned on and off as described above with reference to FIG. 8 or FIGS. 11A and 11B, and if the rotation of the rotation ring 103 is detected, the encoder sensor 130 may remain in an on-state until it may be determined that the rotation ring 103 may no longer be being operated, which may increase the accuracy of an abnormal detection.

Figure 13:
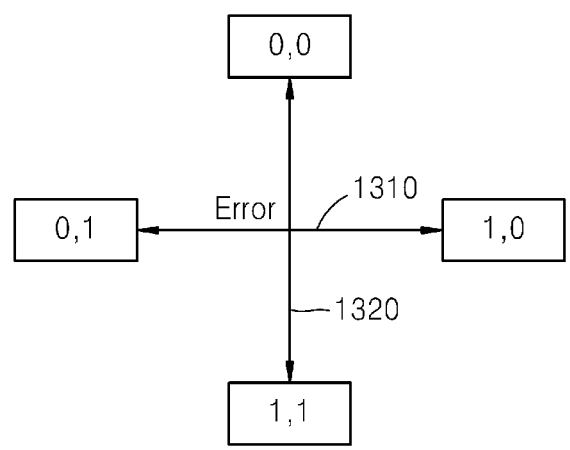
FIG. 13 is a diagram illustrating an example of a determiner configured to detect an abnormal state transition, according to an embodiment of the present inventive concept.

FIG. 13 is a diagram that illustrates an example of the determiner 112 configured to detect an abnormal state transition, according to an embodiment of the present inventive concept.

For example, as described above with reference to FIGS. 5A and 5B, when an encoder sensor is operated without an error, state transition detected from an output signal of the encoder sensor may be generated only in an adjacent state. For example, when a current state is (1,1) in the state transition graph 505 or 515 of FIG. 5A or 5B, an output signal that may be generated may be (1,1) (maintaining the current state), (0,1) (clockwise state transition), or (1,0) (counterclockwise state transition), and an error may be generated if (0,0) is generated.

For example, the state transition illustrated in FIG. 13 may be an abnormal state transition, and the determiner 112 may further include an error detector (not illustrated) configured to process an error if the error is generated.

The error detector (not illustrated) may detect a normal state transition by reducing a time when the encoder sensor is turned on and off if the abnormal state transition of FIG. 13 is detected. In other words, since the abnormal state transition may be highly likely to be generated if the rotation of the rotation ring 103 is not detected and the speed of rotation of the rotation ring 103 is equal to or above a predetermined speed, a detecting cycle may be increased by reducing the time when the encoder sensor may be turned on and off.

For example, reducing the time in which the encoder sensor is operated in an on-state is limited by a stabilization time of components, but the time in which the encoder sensor is turned off may not affect operations of a system even if the time when the encoder sensor may be turned off is short. In an embodiment, if the error detector (not illustrated) detects the abnormal state transition, the time when the encoder sensor is turned off may be reduced.

For example, if the error detector (not illustrated) detects the abnormal state transition in accordance with an embodiment in which the power supply controller 111 controls the encoder sensor 130 to be repeatedly turned on and off, the encoder sensor 130 may remain in an on-state until the error detector (not illustrated) detects a normal state transition.

Figure 14:
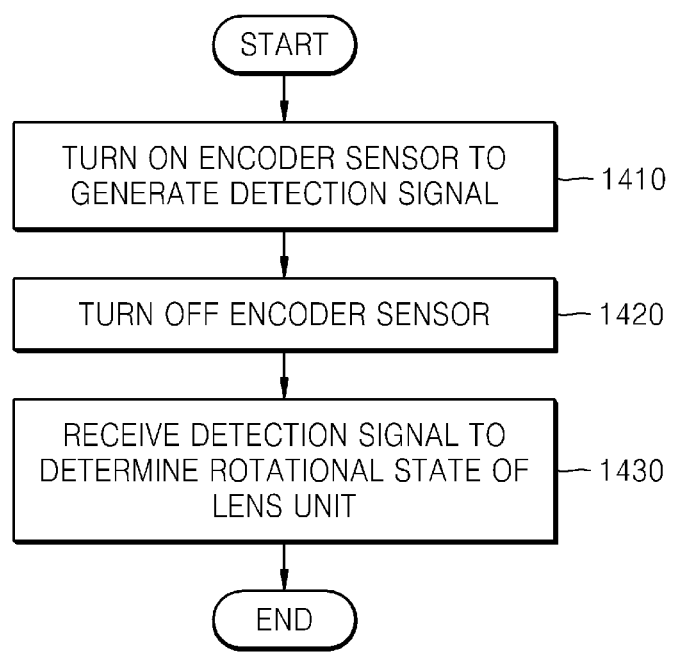
FIG. 14 is a flowchart illustrating a method of a power supply controller controlling an encoder sensor to be turned on and off repeatedly, according to an embodiment of the present inventive concept.

FIG. 14 is a flowchart that illustrates an example of a method of the power supply controller 111 controlling the encoder sensor 130 to be turned on and off repeatedly, according to an embodiment of the present inventive concept.

Referring to FIG. 14, the method may include operations that are performed in a time series in the digital photographing apparatus 1 or the lens unit 100 of FIGS. 1 and 2. In an embodiment, details described above with reference to FIGS. 1 and 2 may also be applied to the method of FIG. 14.

In an operation 1410, the power supply controller 111 may turn on the encoder sensor 130 to generate the detection signal. In an embodiment, the encoder sensor 130 may be turned on to generate the detection signal after a time in which components used in the system are stabilized.

In an operation 1420, the power supply controller 111 may turn off the encoder sensor 130. In an embodiment, the encoder sensor 130 may be turned off to prevent power consumption by the encoder sensor 130. In an embodiment, operations 1410 and 1420 may be repeatedly performed to continuously generate the detection signal.

In an operation 1430, the determiner 112 may receive the detection signal generated by the encoder sensor 130 to determine the rotational state of the lens unit 100. In an embodiment, the rotational state of the rotation ring 103 of the lens unit 100 may be determined to determine whether the focus lens 104 or the zoom lens 102 may have rotated, and the direction of rotation and the amount of rotation of the focus lens 104 or the zoom lens 102.

Figure 15:
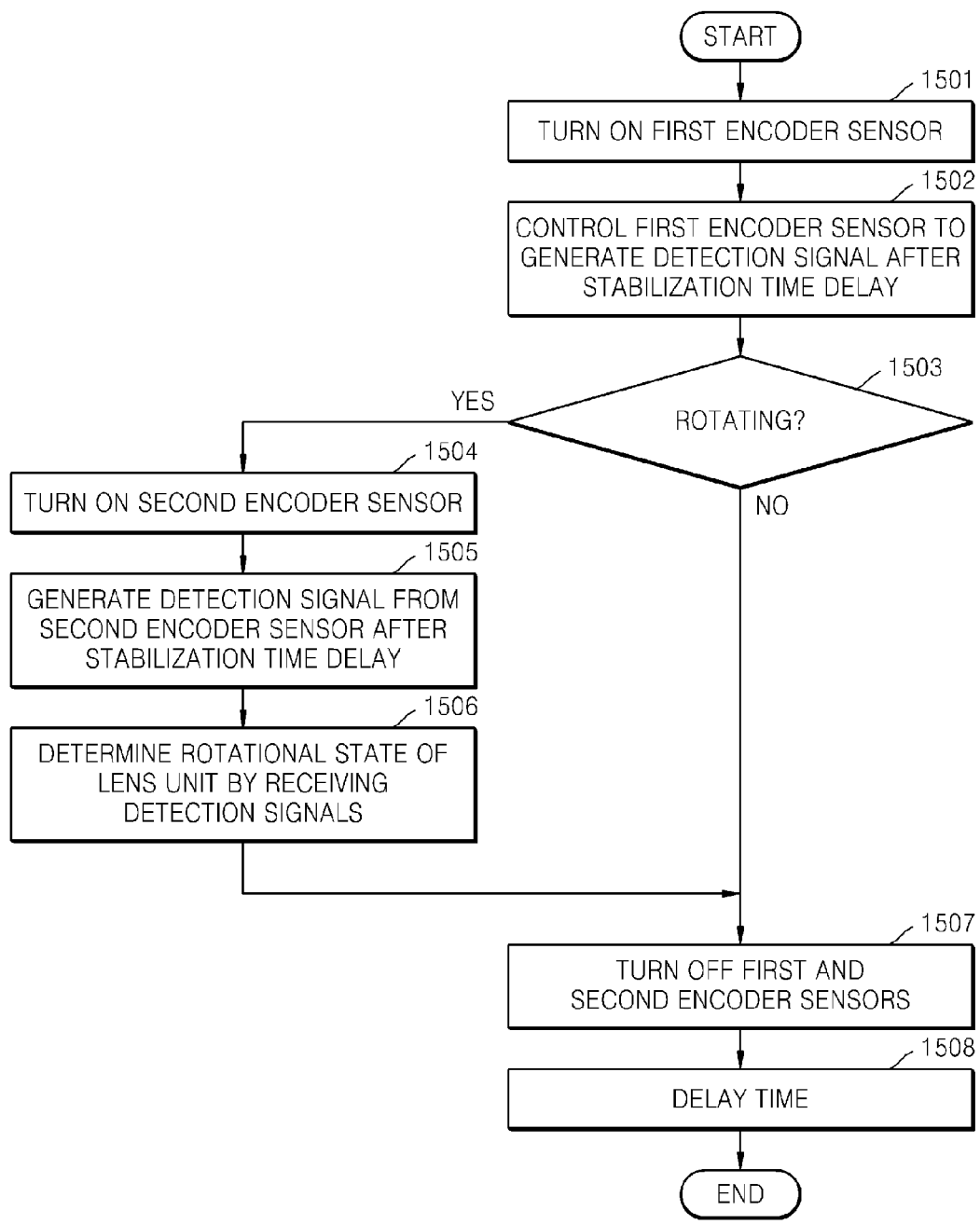
FIG. 15 is a flowchart illustrating an example of a method of a power supply controller controlling an encoder sensor to be turned on and off repeatedly, according to another embodiment of the present inventive concept.

FIG. 15 is a flowchart that illustrates an example of a method of the power supply controller 111 controlling the encoder sensor 130 to be turned on and off repeatedly, according to another embodiment of the present inventive concept.

Referring to FIG. 15, the method may include operations performed in a time series by the digital photographing apparatus 1 or the lens unit 100 shown in FIGS. 1 and 2. In an embodiment, details described above with reference to FIGS. 1 and 2 may also be applied to the method of FIG. 15.

In an operation 1501, the power supply controller 111 may turn on the first encoder sensor 131.

In an operation 1502, the power supply controller 111 may control the first encoder sensor 131 to generate the detection signal after a power supply device has been stabilized.

In an operation 1503, the determiner 112 may receive the detection signal of the first encoder sensor 131 to determine the rotational state of the lens unit 100.

If it has been determined that the lens unit 100 is not rotating, the first encoder sensor 131 may be turned off in an operation 1507 and the first encoder sensor 131 may remain in an off-state for a predetermined time in an operation S1508 to prevent the first encoder sensor 131 from consuming power. In an embodiment, the second encoder sensor 132 may continuously remain in an off-state to prevent power consumption.

Otherwise, if it has been determined that the lens unit 100 is rotating, an operation 1504 may be performed.

In the operation 1504, the power supply controller 111 may turn on the second encoder sensor 132.

In an operation 1505, the power supply controller 111 may control the second encoder sensor 132 to generate the detection signal after the power supply device has been stabilized.

In an operation 1506, the determiner 112 may receive the detection signals generated by the first and second encoder sensors 131 and 132 to determine the rotational state of the lens unit 100.

In the operation 1507, the power supply controller 111 may turn off the first and second encoder sensors 131 and 132, and the first and second encoder sensors 131 and 132 may remain in an off-state in the operation 1508 to prevent power consumption.

Operations 1501 through 1508 may be repeatedly performed to continuously determine the rotational state of the lens unit 100, in accordance with the intended purposes of the inventive concept as described herein.

In the digital photographing apparatus 1, in accordance with one or more embodiments of the present inventive concept described above, the encoder sensor 130 may be turned on and off repeatedly in order to reduce power consumption while the encoder sensor 130 is in an off-state. In an embodiment of the encoder sensor 130 that includes the first and second encoder sensors 131 and 132, detecting the rotational state using only one sensor while the other sensor is in a standby state may further reduce the power consumption of the encoder sensor 130.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, hard disks, optical data storage devices, and personal computer (PC) interfaces (e.g., PCI, PCI-express, or WiFi). The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital photographing apparatus, comprising:
   a lens unit;
   an encoder sensor configured to detect a rotational state of the lens unit, wherein the encoder sensor comprises a first sensor and a second sensor that each have an output signal that have different phases than each other;
   a processor configured to implement:
      a power supply controller configured to reduce power consumption of the encoder sensor by controlling a supply of power to an input of the encoder sensor so that an operation of turning on the encoder sensor to generate a detection signal and an operation of turning off the encoder sensor are repeatedly performed; and
      a determiner configured to determine the rotational state of the lens unit from the detection signal,
      wherein the power supply controller is configured to:
         control the first sensor to repeatedly perform operations of turning on and turning off the first sensor,
         control the second sensor to repeatedly perform operations of turning on and turning off the second sensor if the determiner has determined that the lens unit has rotated, and maintain an off-state of the second sensor if the determiner has determined that the lens unit has not rotated,
wherein the determiner comprises an error detector configured to detect an abnormal state transition in the detection signal, and
wherein the power supply controller is configured to reduce a time that the encoder sensor is operated in an off-state if the error detector has detected the abnormal state transition.

2. The digital photographing apparatus of claim 1, wherein the rotational state comprises at least one of information about whether the lens unit has been rotated, a direction of rotation, an amount of rotation, and a speed of rotation of the lens unit.

3. The digital photographing apparatus of claim 1, wherein the power supply controller is configured to control the first and the second sensors to maintain an on-state if the determiner has determined that the lens unit has rotated.

4. The digital photographing apparatus of claim 1, wherein the determiner is configured to determine a current location of rotation by accumulatively storing the rotational state of the lens unit.

5. The digital photographing apparatus of claim 1, wherein the encoder sensor is configured to detect a rotational state of a focus ring or a zoom ring.

6. The digital photographing apparatus of claim 1, wherein at least one of the first sensor and the second sensor is a photo-sensor.

7. The digital photographing apparatus of claim 1, wherein the encoder sensor at least one of the first sensor and the second sensor is a brush sensor.

8. The digital photographing apparatus of claim 1, wherein the power supply controller is configured to control the encoder sensor to maintain an on-state if the error detector has detected the abnormal state transition.

9. A method of controlling a digital photographing apparatus having a lens unit, an encoder sensor comprising a first sensor and a second sensor that each have an output signal that have different phases than each other, and a power supply controller to control a supply of power to the encoder sensor, the method comprising:
controlling, using the power supply controller, the supply of power to an input of the encoder sensor so that an operation of turning on the encoder sensor to generate a detection signal and an operation of turning off the encoder sensor are repeatedly performed, the turning on the encoder sensor comprising generating the detection signal after a stabilization time delay after the encoder sensor has been turned on;
wherein the controlling of the supply of power to the encoder sensor comprises:
controlling the first sensor to repeatedly perform operations of turning on and turning off the first sensor,
controlling the second sensor to repeatedly perform operations of turning on and turning off the second sensor if the lens unit is determined as having been rotated, and
maintain an off-state of the second sensor if the lens unit is determined as not having been rotated;
and the method further comprising:
determining a rotational state of the lens unit from the detection signal.

10. The method of claim 9, further comprising adjusting a cycle of receiving the detection signal by adjusting a time the encoder sensor is turned off.

11. A non-transitory computer-readable recording medium having recorded thereon a program for executing the method of claim 9.

12. A system of reducing power consumption, comprising:
a first member, wherein a position of a portion of the first member is configured to be changed by a manual adjustment;
a sensor configured to sense the position of the portion of the first member, wherein the sensor comprises a first sensor and a second sensor that each have an output signal that have different phases than each other;
a hardware-based controller configured to:
change a position of a second member in response to the position of the portion of the first member,
control the first sensor to repeatedly turn the first sensor on and off,
control the second sensor to repeatedly turn the second sensor on and off if determined that the first member has rotated, and
maintain an off-state of the second sensor if determined that the first member has not rotated, and
an encoder sensor that generates a detection signal when turned on,
wherein the hardware-based controller is further configured to:
detect an abnormal state transition in the detection signal, and
reduce a time that the encoder sensor is operated in an off-state if the abnormal state transition is detected.

13. The system of claim 12, wherein the first member is a ring, the portion is a protruding portion, and the second member is a lens.

14. The system of claim 13, wherein the intermittent manner is a cycle.

15. The system of claim 14, wherein a portion of the cycle in which the power is provided to the sensor is limited by a stabilization time of electronic components of the system.

16. A non-transitory computer-readable recording medium containing instructions which, when executed by an electronic processing element, cause the electronic processing element to perform a method, the method comprising:
determining, under a control of the electronic processing element, a position for a first member in response to a manual adjustment of a position of a portion of a second member;
determining, under the control of the electronic processing element, a duty-cycle to provide power in an intermittent manner to an input of a sensor, configured to sense the position of the portion of the second member, to reduce power consumption of the sensor, wherein the sensor comprises a first sensor and a second sensor that each have an output signal that have different phases than each other;
generating a detection signal when the sensor is turned on;
detecting an abnormal state transition in the detection signal; and
reducing a time that the sensor is operated in an off-state if the abnormal state transition is detected,
wherein the determining of the duty cycle comprises:
controlling the first sensor to repeatedly turn the first sensor on and off,
controlling the second sensor to repeatedly turn the second sensor on and off if determined that the first member has rotated, and maintaining an off-state of the second sensor if determined that the first member has not rotated.

\* \* \* \* \*